June 5, 1951 E. EBERHARD 2,556,074

PULSE WIDTH SELECTION

Filed Oct. 29, 1947

Inventor
Everett Eberhard
By J. L. Whittaker
ATTORNEY

Patented June 5, 1951

2,556,074

UNITED STATES PATENT OFFICE 2,556,074

PULSE WIDTH SELECTION

Everett Eberhard, Haddonfield, N. J., assignor to Radio Corporation of America, a corporation of Delaware Application October 29, 1947, Serial No. 782,829

11 Claims. (Cl. 250—27)

This invention relates to pulse width selection, and its principal object is to provide improved methods and means for discriminating between pulses of different widths or durations. More specifically, it is an object of the present invention to provide pulse amplifier means which will pass or amplify pulses narrower than a certain width, i. e., those having less than a predetermined duration, and will reject or produce substantially no output in response to pulses of greater width.

Figure 1:
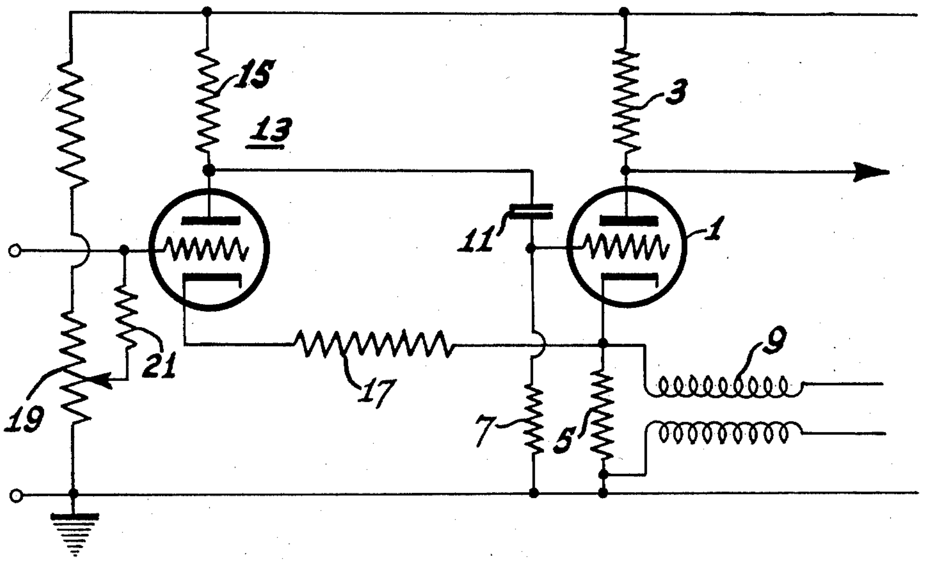

Discrimination between pulses of different widths is required in television practice, for example to separate the line and frame synchronizing pulses, and various circuits have been devised for the purpose. In certain applications, however, it is desired to distinguish between pulses which are much more nearly alike in width than usual line and frame synchronizing pulses. This need is fulfilled by the present invention. The invention will be described with reference to the accompanying drawing, wherein:

Figure 1 is a schematic diagram of a circuit embodying the invention, and

Figures 2*a*, 2*b*, 2*c*, 2*d*, and 2*e* are oscillograms showing wave forms produced in the operation of the circuit of Fig. 1.

Figure 1 shows a preferred embodiment of the invention, including a pulse amplifier tube 1 provided with a plate load resistor 3, a cathode resistor 5, and a grid resistor 7. A delay line 9 is connected across the cathode resistor 5. The delay line 9 is open circuited at its free end, so that a pulse applied to it at the resistor 5 travels out to the open end and is reflected back to the resistor 5 without reversal of polarity. The line 9 may comprise a pair of coils, interwound bifilar fashion on a single form to provide considerable distributed mutual capacitance. The diameter, number of turns, and size of wire can be determined experimentally to make the line 9 of electrical length such that the "out and back" delay, i. e. the time required for a pulse to go to the open end and return to the resistor 5, is substantially equal to the width T of the widest pulse to be amplified. The characteristic impedance $Z_0$ of the line 9 is made approximately equal to the resistance of the cathode resistor 5.

The grid circuit of the tube 1 includes a small capacitor 11, whose capacitance C is so related to the resistance R of the grid resistor 7 that their time constant RC is less than the width of the narrowest pulse to be amplified. This causes differentiation with respect to time of pulses applied to the grid of the tube 1 through the capacitor 11.

The input pulses are applied both to the grid and to the cathode of the tube 1, but in opposite polarities at these two points. In the present example, a phase inverter or paraphase amplifier 13 is used to reverse the polarity of the input pulses for application to the grid circuit of the amplifier 1, and also to apply the input pulses without reversal to the cathode circuit.

The amplifier 13 includes a plate load resistor 15 and also a cathode load which comprises the resistor 5 and a resistor 17 in series therewith. Grid bias is set by a voltage divider 19, connected to the lower end of a grid resistor 21. In this connection it should be observed that the cathode of the tube 1 is positive with respect to ground potential by the amount of the voltage drop in the resistor 5. This drop is proportional to the sum of the plate currents of the tubes 1 and 13. The resistance of the resistor 5 is sufficient to bias the tube 1 substantially to cutoff. The cathode of the tube 13 is even more positive than that of the tube 1, and thus it is necessary to bias the grid of the tube 13 positive with respect to ground to make it act as a "class A" amplifier.

The operation of the described circuit is as follows:

Input pulses are applied in positive-going polarity to the control grid of the tube 13. Three such pulses, of different widths, are shown at 23, 25 and 27 in Figs. 2*a*. Each input pulse causes a correspnding pulsation of the plate current in the tube 13, producing a negative-going pulse at the anode and a positive-going pulse at the cathode. The latter pulses are substantially the same as the input pulses and are not shown in Fig. 2. The voltage pulses at the plate of the tube 13 are similar to the corresponding input pulses, but inverted in polarity as shown at 29, 31 and 33 in Fig. 2*b*.

The negative-going pulse 29 is differentiated by the capacitor 11 and the resistor 7, producing at the grid of the tube 1 a narrow negative-going pulse or "spike" 35 (see Fig. 2*c*), coincident with the leading edge of the pulse 29, and a positive-going spike 37 coincident with the trailing edge of the pulse 29. The spike 37 reaches its peak at the instant when the pulse 29 is decaying most rapidly and is at considerably less than its maximum instantaneous value.

Figure 2A:
Figures 2B, 2C, 2D, 2E:
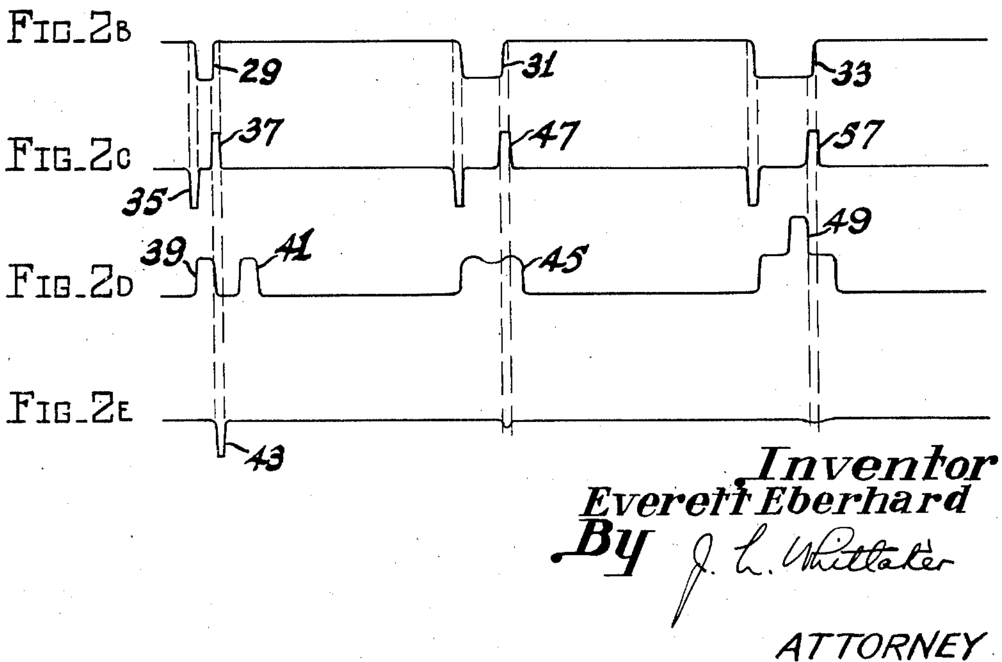

Figure 2*d* shows the voltage produced across the cathode resistor 5 in response to the input pulse 23. The width of the pulse 23 is small compared to the "out and back" delay of the line 9, so two distinct pulses 39 and 41 appear. The pulse 39 is substantially the same as and coincident with the pulse 23. The pulse 41 is the reflected pulse, which returns to the resistor 5 after travelling out and back the line 9.

The tube 1 is biassed substantially to cutoff under static, i. e. no signal, conditions. The pulses 39 and 41 drive the tube 1 further beyond cutoff, by raising the cathode potential. However, the positive going spike 37 reaches the grid of the tube 1 just at the trailing edge of the pulse 39, and causes the tube 1 to conduct momentarily. This produces a negative going output pulse 43 (Fig. 2*e*) at the plate of the tube 1. The pulse 43 substantially coincides with the trailing edge of the input pulse 23.

As long as the leading edge of the reflected pulse 41 comes later than the trailing edge of the pulse 39, the voltage at the cathode of the tube 1 is at less than its maximum positive value when the spike 37 appears, and the output pulse 43 is produced. When the width of the input pulse becomes substantially equal to the delay of the line 9, the leading edge of the reflected pulse merges with the trailing edge of the direct pulse at the resistor 5, producing a single wide pulse as shown at 45 in Fig. 2*d*. The positive going spike 47 derived from the trailing edge of the pulse 31 then occurs while the cathode of the tube 1 is at a relatively high positive potential. The positive spike 47 is not sufficient to overcome the effect of the cathode pulse 45, and little or no conduction occurs through the tube 1.

With still wider input pulses, such as the pulse 27, the direct and reflected pulses overlap at the cathode resistor 5, producing a composite pulse which has a central peak as shown at 49 in Fig. 2*d*. The result is substantially the same as with the narrower input pulse 25, except that the tube 1 is cut off still further when the positive spike 51 is produced by the trailing edge of the pulse 33.

It will be evident that the width of the input pulse may be further increased indefinitely without producing any output from the tube 1. Experiment with the circuit of Fig. 1 has demonstrated that an output ratio of ten to one between one microsecond pulses and two microsecond pulses can be obtained, using a delay line with an out and back delay of one and one half microseconds. The ratio is higher between one microsecond pulses and wider pulses having durations of for example ten microseconds. By proper choice of the values of the resistor 7 and the capacitor 11, the circuit can be made to attenuate pulses which are considerably narrower than the desired width.

Although a specific embodiment of the invention has been described, it will be apparent that various modifications may be introduced without departing from the invention. For example, negative going input pulses may be used, and the connections to the grid and cathode of the tube 1 interchanged. The positions of the delay and differentiating means in the circuit are not necessarily limited to those described, and a separate phase inverter may be used instead of the paraphase amplifier.

I claim as my invention:

1. A pulse translating circuit to which pulses may be applied and which is selectively responsive only to pulses of less than a predetermined duration comprising a valving device which is conductive in response to an enabling voltage and non-conductive in response to a disabling voltage, means for applying said pulses to the device as a first disabling voltage which is effective for the duration of each pulse, means for differentiating said pulses to produce an enabling voltage starting at the end of each pulse and having a short duration extending therebeyond, means for applying the enabling voltage to the device to cause it to conduct after the pulse in the absence of the simultaneous application of a second disabling voltage, means for delaying the pulse and thereafter applying it to the device as a second disabling voltage, said last -mentioned means delaying the pulse for an interval of time which is longer than the duration of the longest pulse to be passed by the translating circuit by a period of time not substantially greater than said short duration of the enabling voltage.

2. A pulse translating circuit for selectively responding to pulses having durations of less than a predetermined value to produce for each a corresponding output impulse and for being unresponsive to pulses having greater durations including a variably-conductive device responsive to different voltages to vary in its conductivity, means for applying a bias voltage to the device for rendering it normally non-conductive, means for applying each input pulse to the device both directly and also after a predetermined time delay to disable the device during each application of the pulse thereto, means for differentiating each input pulse with respect to time, and means for applying each differentiated input pulse to said device to cause it to be conductive for a short impulse-time after the end of said pulse unless the device is already being disabled by the delayed application of the input pulse, said time delay being longer than said predetermined value by an interval not substantially greater than said short impulse-time.

3. A pulse-translating circuit selectively responsive only to pulses of less than a predetermined duration comprising a discharge device having an anode and at least two other electrodes including a cathode and a control grid, means for establishing a cathode-to-control grid bias to render the tube normally nonconducting, means for applying each input pulse to one of said other electrodes both directly and also after a predetermined time delay completely to cut off its anode current during each application of the pulse, means for differentiating each input pulse with respect to time, and means for applying each differentiated input pulse to the other of said other electrodes to cause the device to be conductive for a short impulse-time after the end of said pulse unless the anode current of the device is already being cut off by the delayed application of the input pulse, said time delay being longer than said predetermined value by an interval not substantially greater than said short impulse-time.

4. A pulse translating circuit as in claim 3 in which said means for applying each input pulse to one of said other electrodes comprises a delay line for receiving said pulse at the time when it is directly applied to said electrode, for retaining it in transit over the line during said time delay, and for thereafter applying it to said electrode.

5. A pulse translating circuit as in claim 4 which further comprises a cathode resistor connected between said cathode and control grid, one end of said delay line being connected across said cathode resistor, and its other end being open-circuited to offer a reflective discontinuity to a pulse reaching it after moving over the line in the direction from said first-mentioned end of the delay line.

6. A pulse translating circuit as in claim 3 which also comprises a paraphase amplifier arranged to receive the input pulses before they reach said discharge device, the paraphase amplifier having two output circuits respectively connected to said means for applying each input pulse to one of said other electrodes and to said means for differentiating.

7. A pulse translating circuit as in claim 3 in which said means for applying each input pulse to one of said other electrodes includes a delay line for receiving said pulse at the time when it is directly applied to said electrode, for retaining it in transit over the line during said time delay, and for thereafter applying it to said electrode; and the translating circuit further comprises a cathode resistor connected between said cathode and control grid, one end of said delay line being connected across said cathode resistor and its other end being open-circuited to offer a reflective discontinuity to a pulse reaching it after moving over the line in the direction from said first-mentioned end of the delay line, a paraphase amplifier arranged to receive the input pulses before they reach said discharge device, the paraphase amplifier having a first output circuit connected to said means for applying each input pulse to one of said other electrodes and a second output circuit connected to said means for differentiating, and a resistor of high resistance value in series in said first output circuit between the paraphase amplifier and one end of said cathode resistor for preventing the paraphase amplifier from short circuiting the delay line.

8. A pulse width discriminator circuit to which pulses of different widths or durations may be applied and which passes only pulses that are narrower than a predetermined width, said discriminator circuit comprising a gate circuit that may be gated to prevent the passage of signal therethrough during the application of a gating pulse thereto, means for differentiating said applied pulses and for applying the resulting differentiated back edge pulses to said gate circuit so as to tend to make said gate circuit pass signal, and means for applying said applied pulses as gating pulses to said gate circuit with a certain delay and with such polarity and amplitude as to block said gate circuit even with said back edge pulses applied to said gate circuit, said certain delay being substantially equal to the duration of the widest pulse that is to be passed by said discriminator circuit.

9. A pulse width discriminator circuit to which pulses of different widths or durations may be applied and which passes only pulses that are narrower than a predetermined width, said circuit comprising an amplifier tube that is biased so as not to pass signal in the absence of applied pulses, means for differentiating said applied pulses and for applying the resulting differentiated back edge pulses to said amplifier with such polarity as to tend to make said tube pass signal, and means for applying said applied pulses to said amplifier with a certain delay and with such polarity and amplitude as to block said amplifier even with said back edge pulses applied to said amplifier, said certain delay being substantially equal to the duration of the widest pulse that is to be passed by said discriminator circuit.

10. A pulse width discriminator circuit to which pulses of different widths or durations may be applied and which passes only pulses that are narrower than a predetermined width, said circuit comprising an amplifier tube that is biased so as not to pass signal in the absence of applied pulses, means for differentiating said applied pulses and for applying the resulting differentiated back edge pulses to said amplifier with such polarity as to tend to make said tube pass signal, means for also applying said applied pulses substantially undelayed to said amplifier with such polarity and amplitude as to block said amplifier even with said back edge pulses applied to said amplifier, and means for applying said applied pulses to said amplifier with a certain delay and with such polarity and amplitude as to block said amplifier even with said back edge pulses applied to said amplifier, said certain delay being substantially equal to the duration of the widest pulse that is to be passed by said discriminator circuit.

11. A pulse width discriminator circuit to which pulses of different widths may be applied and which passes only pulses narrower than a predetermined width, said circuit comprising a vacuum tube having an anode, a cathode and at least one control electrode, said tube having a cathode circuit and having an anode circuit from which pulses are taken when passed by said discriminator circuit, means for maintaining said tube biased substantially to cut-off in the absence of an applied pulse, means for differentiating said applied pulses and for applying the resulting differentiated back edge pulses to said control electrode with positive polarity, a delay line having its input end connected across said cathode circuit and having its other end open so as to reflect voltage pulses without change of polarity, and means for impressing said applied pulses across said delay line input circuit with positive polarity, said delay line having a delay for a pulse travelling down the line and back that is substantially equal to the duration of the widest pulse that is to be passed by said discriminator circuit.

EVERETT EBERHARD.

REFERENCES CITED

The following references are of record in the file of this patent:

UNITED STATES PATENTS

| Number | Name | Date |
|---|---|---|
| 2,425,066 | Labin | Aug. 5, 1947 |

FOREIGN PATENTS

| Number | Country | Date |
|---|---|---|
| 528,192 | Great Britain | Oct. 24, 1940 |